United States Patent [19]

Kawamura

[11] Patent Number: 5,156,123

[45] Date of Patent: * Oct. 20, 1992

[54] ENGINE WITH VARIABLE COMBUSTION CHAMBER

[75] Inventor: Hideo Kawamura, Samukawa, Japan

[73] Assignee: Isuzu Motors Limited, Tokyo, Japan

[*] Notice: The portion of the term of this patent subsequent to Dec. 3, 2008 has been disclaimed:

[21] Appl. No.: 731,338

[22] Filed: Jul. 17, 1991

Related U.S. Application Data

[63] Continuation of Ser. No. 589,545, Sep. 28, 1990.

[30] Foreign Application Priority Data

Sep. 30, 1989 [JP] Japan ................... 1-256418

[51] Int. Cl.⁵ .............................................. F02B 19/00
[52] U.S. Cl. .................................... 123/256; 123/276; 123/292
[58] Field of Search ............... 123/256, 292, 276, 259, 123/304, 1 A, 261

[56] References Cited

U.S. PATENT DOCUMENTS

| | | | |
|---|---|---|---|
| 4,160,432 | 7/1979 | Tsutumi | 123/256 |
| 4,161,927 | 7/1979 | Yagi et al. | 123/256 |
| 4,241,703 | 12/1980 | Lin-Law | 123/292 |
| 4,372,264 | 2/1983 | Truao | 123/292 |
| 4,401,072 | 8/1983 | Ito et al. | 123/292 |
| 4,440,124 | 4/1984 | Eckert | 123/261 |
| 4,522,173 | 6/1985 | Agachie | 123/276 |
| 4,532,899 | 8/1985 | Lorts | 123/292 |
| 4,726,331 | 2/1988 | Hoppie et al. | 123/276 |
| 4,745,891 | 5/1988 | Cola | 123/256 |
| 5,069,178 | 12/1991 | Kawaurkra | 123/256 |

*Primary Examiner*—Raymond A. Nelli
*Attorney, Agent, or Firm*—Staas & Halsey

[57] ABSTRACT

An engine with a variable combustion chamber has a a first combustion chamber defined in a piston slidably disposed in a cylinder, a second combustion chamber defined in a cylinder head and communicating with the cylinder through a communication port, and a valve for opening and closing the communication port. When the engine is under low load, the valve is closed and fuel is injected into the first combustion chamber, so that the engine operates as a direct-injection-type engine. When the engine is under high load, the valve is opened and fuel is injected into the second combustion chamber, so that the engine operates as a prechamber-type engine.

14 Claims, 2 Drawing Sheets

ENGINE WITH VARIABLE COMBUSTION CHAMBER

This application is a continuation of application Ser. No. 07/589,545, filed Sep. 28, 1990.

BACKGROUND OF THE INVENTION

1. Field of the Invention

The present invention relates to an engine with a variable combustion chamber which can be modified into a direct-injection-type combustion chamber when the engine operates under low load and a prechamber-type combustion chamber when the engine operates under high load, and more particularly to such an engine which employs alcohol as fuel.

2. Description of the Related Art

Conventional engines use fossil fuel such as gasoline, light oil, or the like, as fuel. However fossil fuel is a limited natural resource. Further, exhaust gases emitted from engines which burn gasoline, light oil, etc. contain harmful substances which are partly responsible for air pollution. Various efforts have been made to eliminate or reduce these shortcomings. These efforts include creation of an engine which uses alcohol as fuel which is chemically or biochemically produced.

Alcohol has a greater latent heat value of vaporization and generates smaller heat than conventional fuels. For example, in order to produce the same amount of heat, it is necessary to supply an engine with 1.6 times as much alcohol as light oil. Since the amount of alcohol injected into an engine cylinder must thereby be larger, air and injected alcohol are not easily mixed together in the combustion chamber, and the time required for the alcohol to be diffused and combusted is longer. Especially when the engine is subjected to high load, the amount of alcohol to be injected is increased and hence the engine output power and the combustion efficiency are lowered.

When 1.6 times as much alcohol as light oil is supplied, then its latent heat of vaporization is about 5.6 times that of light oil. Therefore, alcohol has less of a tendency to be vaporized in the combustion chamber. When the engine is started or the temperature of ambient air is low, alcohol is not fully burned, and unburned gases are emitted from the engine, which results in unpleasant odors and air polluted by harmful substances contained in the emitted unburned gases. An additional problem is that, the injected alcohol may not be ignited, and the engine may not be started.

Various engines with variable compression ratios have been proposed in order to improve starting ability at low temperatures. For example, Japanese Utility Model Publication No. 57(1982)-164224 discloses an engine having a main combustion chamber and an auxiliary chamber communicating therewith. In addition to intake and exhaust valves, a third valve is disposed in the opening of the auxiliary chamber. When the engine is under low load, the opening of the auxiliary chamber is closed by the third valve, giving the engine a higher compression ratio. When the engine is under high load, the third valve is opened on each compression stroke, thus reducing the compression ratio for the prevention of knocking. However, the disclosed engine cannot solve the problems referred to above.

SUMMARY OF THE INVENTION

It is an object of the present invention to provide an engine with a variable combustion chamber with which the engine can be started well even it if uses alcohol fuel, and which prevents combustion efficiency from being lowered when the engine operates under high load.

To accomplish this object, an engine is provided with a variable combustion chamber which has a first combustion chamber defined in a piston slidably disposed in a cylinder, a second combustion chamber defined in a cylinder head and communicating with the cylinder through a communication port, and a valve for opening and closing the communication port. When the engine is under low load, the valve is closed and fuel is injected into the first combustion chamber, so that the engine operates as a direct-injection-type engine. When the engine is under high load, the valve is opened and fuel is injected into the second combustion chamber, so that the engine operates as a prechamber-type engine.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
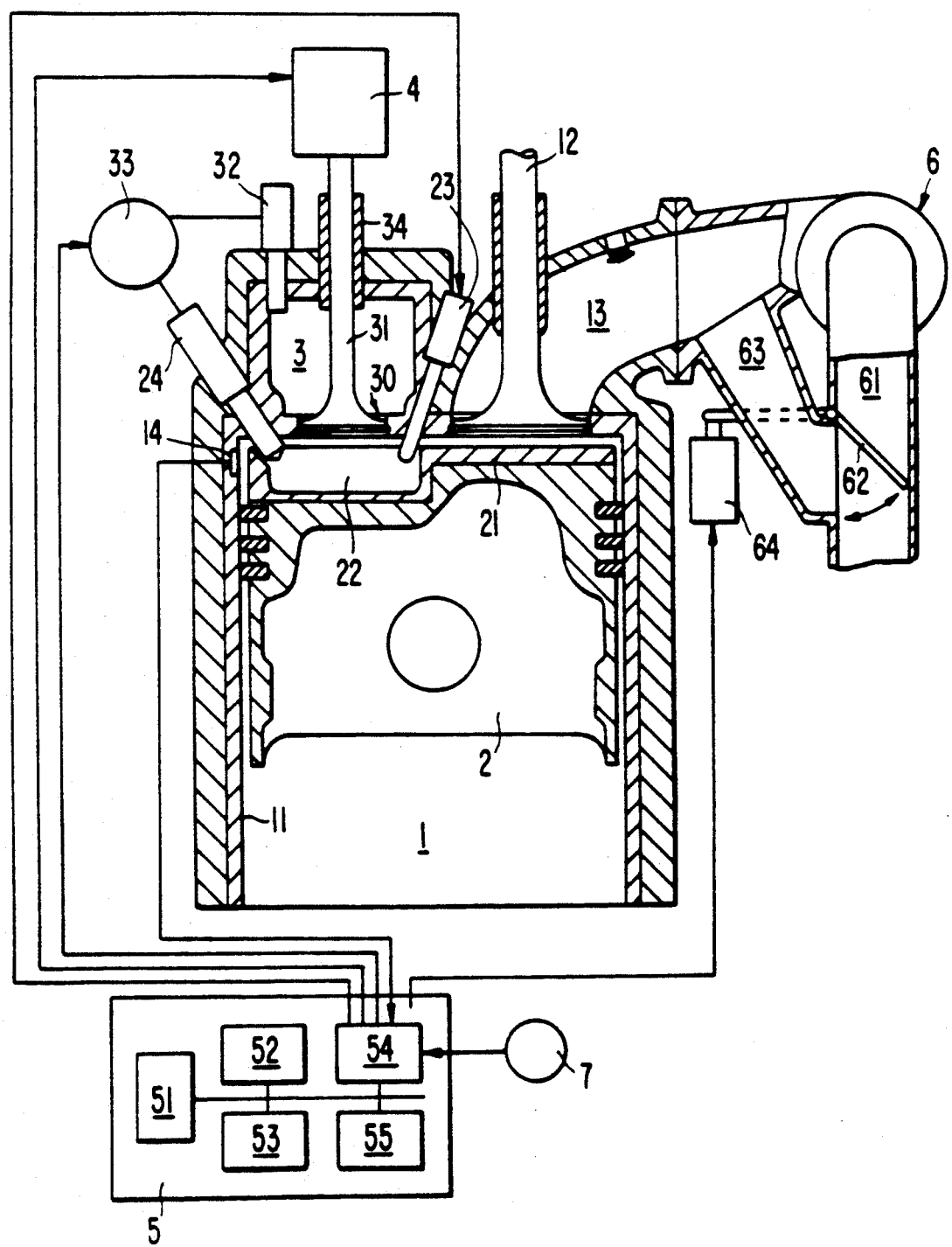
FIG. 1 is a schematic cross-sectional view, partly in block form, of an engine with a variable combustion chamber according to the present invention.

FIG. 1 shows, partly in block form, an engine with a variable combustion chamber according to the present invention.

The engine has a cylinder 1 whose inner wall surface is lined with a cylinder sleeve 11 that is made of a heat insulating ceramic material such as silicon nitride, zirconia, or the like. The cylinder sleeve 11 has in its upper portion a pressure sensor 14 for measuring the pressure in the cylinder 1. A cylinder head mounted on the cylinder 1 has an intake passage 13 defined therein which is selectively openable and closable by an intake valve 12. Although not shown, the cylinder head also has an exhaust passage defined therein which is selectively openable and closable by an exhaust valve.

A piston 2 is slidably disposed in the cylinder 1. The piston 2 has a piston head covered with a heat insulating layer 21 which is made of the same heat insulating ceramic material as the material of the cylinder sleeve 11. The piston head of the piston 2 has a recess defined therein as a first combustion chamber 22. The cylinder head supports a glow plug 23 which can be positioned in the first combustion chamber 22 when the piston 2 reaches the top dead center and a first nozzle 24 for injecting fuel such as alcohol fuel into the first combustion chamber 22 when the piston 2 reaches the top dead center.

The cylinder head has a second combustion chamber 3 defined therein and connected to, or communicating with the cylinder 1 through a connection port, communication port 30. The communication port 30 is openable and closable by a valve 31 disposed therein, the valve 31 being axially slidably supported in the cylinder head by a valve guide 34. The cylinder head supports a second nozzle 32 for injecting fuel such as alcohol fuel into the second combustion chamber 3. The first nozzle 24 and the second nozzle 32 are connected to a fuel pump 33 so that they are supplied with fuel such as alcohol fuel. The fuel pump 33 can start and stop the supply of fuel to the first nozzle 24 and the second nozzle 32 at timings which can be freely varied by signals applied to the fuel pump 33. The second combustion chamber 3 has an inner wall made of the same heat insulating ceramic material as the material of the cylinder sleeve 11. The valve 31 and the valve guide 34 are made of a high-strength heat insulating ceramic material.

A valve opening and closing mechanism 4 is coupled to the shank end of the valve 31. The valve opening and closing mechanism 4 comprises an electromagnetic solenoid which electromagnetically attracts a magnetic member joined to the shank end of the valve 31. The valve 31 is normally lifted upwardly in FIG. 1, closing the communication port 30. When the valve 31 is driven downwardly by the valve opening and closing mechanism 4, the valve 31 opens the communication port 30.

The pressure sensor 14, the glow plug 23, the fuel pump 33, and the valve opening and closing mechanism 4 are electrically connected to an input/output interface 54 of a control unit 5. The control unit 5 comprises, in addition to the input/output interface 54, a ROM 52 for storing a program and relevant data, a CPU 51 for carrying out calculations under the control of the program stored in the ROM 52, a RAM 53 for temporarily storing the results of the calculations and data, and a control memory 55 for controlling the flow of signals in the control unit 5.

The intake passage 13 is connected to the outlet port of a compressor of a turbocharger 6. The compressor of the turbocharger 6 has an inlet port connected to an intake pipe 61 which is branched into a bypass pipe 63 coupled to the intake passage 13. A selector valve 62 is disposed in the intake pipe 61 where the bypass pipe 63 is branched therefrom. The selector valve 62 is connected to a solenoid actuator 64 which selectively opens and closes the selector valve 62. The solenoid actuator 64 is electrically connected to the input/output interface 54 of the control unit 5, and opens and closes the selector valve 62 in response to a signal from the input/output interface 54. The turbocharger 6 has a rotatable shaft (not shown) on which a rotary electric machine (not shown) is mounted. When intake air is not supplied to the compressor of the turbocharger 6 by the selector valve 62, the rotary electric machine is operated as a generator thereby to convert the energy of exhaust gases emitted from the engine into electric energy to be recovered.

The load on the engine is detected by a load sensor 7 based on the amount of depression of an accelerator pedal (not shown). A load signal detected by the load sensor 7 is applied to the input/output interface 54.

Figure 2:
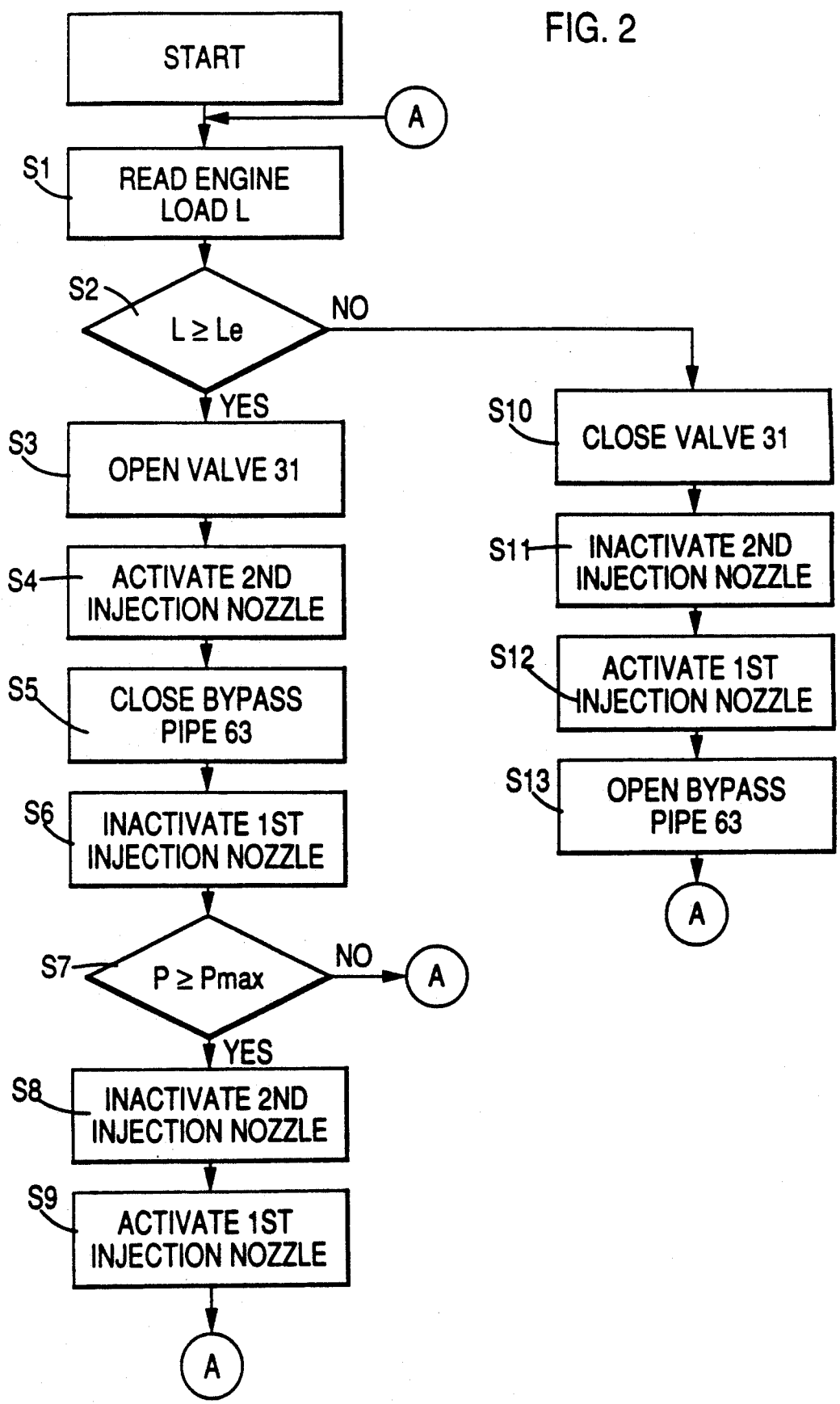
FIG. 2 is a flowchart of an operation sequence of the engine with a variable combustion chamber shown in FIG. 1.

Operation of the engine thus constructed will now be described below with reference to FIG. 2.

In step S1, an engine load signal L from the load sensor 7 is read by the control unit 5 through the input/output interface 54. The engine load signal L is then compared by the control unit with a preset load Le stored in the ROM 52 in step S2. If $L \geq Le$, then control goes to step S3, but if $L < Le$, control goes to a step S10.

If $L \geq Le$, since the engine undergoes high load, the engine through the execution of steps S3–S6 is operated as a prechamber-type engine. More specifically, in step 3 the control unit 5 sends a signal to the valve opening and closing mechanism 4 to move the valve 31 downwardly, thus opening the communication port 30. In step 4, the control unit 5 sends a signal to the fuel pump 33 to control the fuel pump 33 to supply fuel to the second nozzle 32 at a predetermined timing. In step S5 the control unit 5 sends a signal to the solenoid actuator 64 to cause the selector valve 62 to close the bypass pipe 63. As a result, intake air is now introduced into the intake pipe 61 and compressed by the compressor of the turbocharger 6, so that compressed intake air is supplied into the cylinder 1 through the intake passage 13. In a step S6, signal is transmitted from the control unit 5 to the fuel pump 33 to stop the supply of fuel to the first nozzle 24. If the pressure in the cylinder 1 unduly builds up while the engine is operating as a prechamber-type engine under high load, the engine may be broken down. In view of such a danger, steps S7 to S9 are performed to monitor the pressure in the cylinder 1. In step S7, the control unit 5 reads a cylinder pressure signal P from the pressure sensor 14 and compares the signal P with a maximum cylinder pressure Pmax stored in the ROM 52. If $P \geq Pmax$, then control proceeds to steps S8 and S9. If $P < Pmax$, then control returns to the step S1 to execute the entire flow cycle again. In step S8 the control unit 6 sends, a signal to the fuel pump 33 to stop the supply of fuel to the second nozzle 32. In step S9, fuel is supplied to the first nozzle 24 for lower engine load, thereby lowering the pressure in the cylinder 1.

If $L < Le$ in the step S2, since engine is under low load the engine is operated as a direct-injection-type engine with only the first combustion chamber 22 used as a sole combustion chamber, through the execution of steps S10–S13. More specifically, in step S10 the control units sends a signal to the valve opening and closing mechanism 4 to lift the valve 31 thereby closing the communication port 30. In step S11, the control unit 5 sends a signal to the fuel pump 33 to stop the supply of fuel to the second nozzle 32. In step S12, fuel is supplied to the first nozzle 24.

In step S13, the control unit 5 sends a signal to the solenoid actuator 64 to move the selector valve 62 to open the bypass pipe 63. Thereafter, control goes back to the step 1 and execution of the entire flow cycle is repeated.

The direct-injection-type engine operated by the steps S10 through S13 has a compression ratio ranging from 20 to 21, which is higher than the compression ratio of ordinary direct-injection-type engines. Since the temperature in the cylinder at the compression stroke end is higher than the corresponding temperature, about 650° C., of ordinary direct-injection-type engines, the direct-injection-type engine according to the present invention can be well started even if alcohol fuel is used. Since the direct-injection-type engine has a smaller combustion chamber inner wall area, it has a lower cooling loss and hence provides good fuel economy.

With the prechamber-type engine which is operated by the steps S3 through S6, when intake air flows through the communication port 30 into the prechamber or second combustion chamber 3, an intake air swirl is developed in the second combustion chamber 3. Therefore, even when a large amount of fuel is injected from the second nozzle 32 into the second combustion chamber 3, the intake air and the fuel can quickly be mixed together, so that adequate fuel combustion is achieved. When the communication port 30 is opened, the volume of the combined combustion chamber becomes larger by the volume of the second combustion chamber 3. Since, however, the valve 31 is opened and the engine is supercharged by the turbocharger 6, the density of intake air in the combustion chamber is not reduced as compared with the direct-injection-type engine.

Whether the engine of the present invention operates as a direct-injection-type engine or a prechamber-type engine, additional advantages are realized because the inner wall of the combustion chamber is covered with a heat insulating material. As a result, exhaust gases emitted from the engine are of high temperature and hence have large energy. The surface of the heat insulating material on the inner wall of the cylinder is prevented from being abnormally over heated since injected fuel is rapidly vaporized while absorbing latent heat of vaporization from the surface of the heat insulating material.

According to the present invention, as described above, when the engine is under low load and the amount of injected fuel is low, the engine operates as a direct-injection-type engine having a high compression ratio. Therefore, the fuel consumption is low, the engine can be started easily, and emission of unburned gases is minimized. When the engine is under high load, it operates as a prechamber-type engine. Therefore, alcohol fuel and intake air are rapidly mixed together, without sacrificing the output power and efficiency of the engine.

Although a certain preferred embodiment has been shown and described, it should be understood that many changes and modifications may be made therein without departing from the scope of the appended claims.

What is claimed is:

1. An engine comprising:
   a cylinder;
   a piston slidably disposed in said cylinder and having a first combustion chamber;
   a cylinder head mounted on said cylinder and having a second combustion chamber connected to said cylinder through a connection port;
   a valve slidably disposed in said cylinder head for opening and closing said connection port;
   intake and exhaust passages connected to said cylinder;
   a first fuel injection nozzle injecting fuel into the first combustion chamber;
   a second fuel injection nozzle fuel into said second combustion chamber;
   fuel supply means for supplying fuel to one of said first and second fuel injection nozzles at a time;
   valve actuating means for actuating said valve to open and close said connection port;
   load detecting means for detecting a load on the engine; and
   control means for operating said valve actuating means to open said valve and controlling said fuel supply means to supply fuel to said second fuel injection nozzle when the load on the engine as detected by said load detecting means is equal to or higher than a predetermined value, and for operating said valve actuating means to close said valve and controlling said fuel supply means to supply fuel to said first fuel injection nozzle when the load on the engine as detected by said load detecting means is lower than said predetermined value.

2. An engine according to claim 1, further comprising a glow plug extending into said first combustion chamber.

3. An engine according to claim 1, wherein said second combustion chamber has an inner wall made of a ceramic material.

4. An engine according to claim 1, wherein said second combustion chamber has an inner wall made of a ceramic material, and said valve is made of the ceramic material.

5. An engine according to claim 1, wherein said first and second combustion chambers have inner walls made of a ceramic material.

6. An engine according to claim 1, further comprising supercharging means connected to the intake passage, for supplying supercharged air in the intake passage, a bypass passage connected to said intake passage on opposite sides of and bypassing said supercharging means, and a selector valve connected to the intake passage and the bypass passage, and wherein
   said control means comprises means for operating said selector valve to close said bypass passage when the load on the engine as detected by said load detecting means is equal to or higher than said predetermined value, and for operating said selector valve to open said bypass passage when the load on the engine as detected by said load detecting means is lower than said predetermined value.

7. An engine according to claim 1, further comprising a pressure sensor detecting a pressure in said cylinder, and wherein
   said control means comprises means for stopping the supply of fuel to said second fuel injection nozzle and supplying fuel to said first fuel injection nozzle when the pressure in the cylinder as detected by said pressure sensor is equal to or higher than a predetermined maximum pressure.

8. A variable combustion chamber system in an engine having a cylinder which has an intake opening and which contains a piston with a first combustion chamber,
   said variable combustion system comprising:
   a second combustion chamber connected to the first combustion chamber by a valve;
   fuel injection means for injecting fuel into said second combustion chamber;
   compressed air supply means for supplying compressed air to the cylinder through the intake opening;
   load detection means for detecting a load placed on the engine; and
   chamber control means for operating said valve to connect said second combustion chamber to the first combustion chamber, for operating said fuel injection means to inject fuel into said second combustion chamber, and for operating said compressed air supply means to supply compressed air to the cylinder when the load detected by said load detection means exceeds a predetermined amount.

9. A variable combustion chamber system according to claim 8, further comprising:
   pressure detection means for detecting pressure within the cylinder; and
   wherein said chamber control means operates said valve to disconnect said second combustion chamber from the first combustion chamber, prevents said fuel injection means for injecting the fuel into said second combustion chamber, and prevents said compressed air supply means from supplying the compressed air to the cylinder, when the pressure detected by said pressure detecting means exceeds a predetermined amount.

10. A variable combustion chamber system according to claim 8, wherein said chamber control means operates said valve to disconnect said second combustion chamber from the first combustion chamber, prevents said fuel injection means from injecting fuel into said second combustion chamber, and prevents said compressed air supply means from supplying compressed air to the cylinder, when the load detected by said load detection means does not exceed the predetermined load amount.

11. A variable combustion chamber system according to claim 8, wherein said chamber control means comprises
an input/output interface connected to said valve, said fuel injection means, said compressed air supply means, and said load detection means,
storage for storing a control program controlling the valve, said fuel injection means, said compressed air supply means and said load detection means, and for storing data therefrom and
a CPU for performing calculations under control of the control program.

12. A variable combustion chamber control process in an engine having a cylinder which has an intake opening and which contains a piston with a first combustion chamber and a second combustion chamber connectable to the first combustion chamber by a valve said process comprising the steps of:
   (a) detecting a load placed on the engine;
   (b) reading the load into a computer;
   (c) comparing the load to a predetermined load valve in the computer; and
   (d) opening the valve to connect the first and second combustion chamber, injecting fuel into the second combustion chamber, and supplying compressed air to the intake opening when the load exceeds the load predetermined valve.

13. A variable combustion chamber control process according to claim 12, further comprising the steps of:
   (e) detecting a pressure within the cylinder; and
   (f) reading the pressure into a computer;
   (g) comparing the pressure with a predetermined pressure valve; and
   (h) closing the valve to disconnect the first and second combustion chamber, preventing fuel injection into the second combustion chamber, and preventing compressed air from being supplied to the intake opening when the pressure exceeds the predetermined pressure valve.

14. A variable combustion chamber control process according to claim 13, wherein steps (a) through (g) are executed repetitively during operation of the engine.

* * * * *

UNITED STATES PATENT AND TRADEMARK OFFICE
CERTIFICATE OF CORRECTION

PATENT NO. : 5,156,123
DATED : October 20, 1992
INVENTOR(S) : Hideo KAWAMURA

It is certified that error appears in the above-identified patent and that said Letters Patent is hereby corrected as shown below:

Title Page, Section [63], after "1990" insert --, now USP 5,069,178, issued December 3, 1991--;

Section [56], Col. 2, line 2, change "Lin-Law" to --Lin-Liaw--;

Section [56], Col. 2, line 3, change "Truao" to --Trucco--;

Section [56], Col. 2, line 6, change "Agachie" to --Agache--; and

Section [57], line 1, delete "a" (third occurrence).

Column 1, line 6, after "1990" insert --, now USP 5,069,178, issued December 3, 1991--; and line 20, after "However" insert --,--.

UNITED STATES PATENT AND TRADEMARK OFFICE
CERTIFICATE OF CORRECTION

PATENT NO. : 5,156,123
DATED : October 20, 1992
INVENTOR(S) : Hideo Kawamura

It is certified that error appears in the above-indentified patent and that said Letters Patent is hereby corrected as shown below:

Column 4, line 29, change "6" to --5--;
          line 34, delete "the";
          line 39, change "units" to --unit 5--; and
          line 48, change "step 1" to --step S1--.

Signed and Sealed this

Twenty-eighth Day of December, 1993

Attest:

BRUCE LEHMAN

Attesting Officer      Commissioner of Patents and Trademarks